United States Patent
Saha et al.

(10) Patent No.: US 12,185,301 B2
(45) Date of Patent: Dec. 31, 2024

(54) SUBCARRIER SPACING AND CYCLIC PREFIX SWITCHING IN WIRELESS COMMUNICATION

(71) Applicant: QUALCOMM Incorporated, San Diego, CA (US)

(72) Inventors: Chiranjib Saha, San Diego, CA (US); Le Liu, San Jose, CA (US); Alberto Rico Alvarino, San Diego, CA (US); Umesh Phuyal, San Diego, CA (US); Kazuki Takeda, Tokyo (JP); Vishnu Vardhan Chetlur Ravi, San Diego, CA (US); Peter Gaal, San Diego, CA (US); Xiao Feng Wang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 416 days.

(21) Appl. No.: 17/568,503

(22) Filed: Jan. 4, 2022

(65) Prior Publication Data
US 2023/0217428 A1    Jul. 6, 2023

(51) Int. Cl.
*H04W 72/04* (2023.01)
*H04W 72/1263* (2023.01)
*H04W 92/18* (2009.01)

(52) U.S. Cl.
CPC ........ *H04W 72/1263* (2013.01); *H04W 92/18* (2013.01)

(58) Field of Classification Search
CPC .......... H04W 72/1263; H04W 92/18; H04L 5/0007; H04L 5/0053; H04L 5/0064; H04L 5/0044; H04L 27/2602; H04L 27/26025; H04L 27/2607
See application file for complete search history.

(56) References Cited

U.S. PATENT DOCUMENTS

| | | | |
|---|---|---|---|
| 2018/0139599 A1* | 5/2018 | Yasukawa | H04W 8/005 |
| 2018/0206260 A1* | 7/2018 | Khoryaev | H04W 72/56 |
| 2020/0029318 A1 | 1/2020 | Guo | |
| 2020/0053768 A1* | 2/2020 | Chen | H04W 72/1263 |
| 2020/0153574 A1* | 5/2020 | Shin | H04W 4/40 |

(Continued)

FOREIGN PATENT DOCUMENTS

WO    2020064176 A1    4/2020

OTHER PUBLICATIONS

International Search Report and Written Opinion—PCT/US2022/050594—ISA/EPO—May 9, 2023.

*Primary Examiner* — Mahbubul Bar Chowdhury
(74) *Attorney, Agent, or Firm* — Loza & Loza, LLP

(57) ABSTRACT

A wireless communication device can flexibly change subcarrier spacing (SCS) and/or cyclic prefix (CP) in wireless communication. The wireless communication device can transmit, in a first sidelink resource of a sidelink resource pool, a first sidelink transmission using a first configuration of subcarrier spacing (SCS) and cyclic prefix (CP). The wireless communication device can further transmit, in a second sidelink resource of the sidelink resource pool, a second sidelink transmission using a second configuration of SCS and CP, the second configuration being different from the first configuration in terms of at least one of an SCS or a CP. The techniques allow more efficient switching between SCS and CP configurations within a resource pool in the same bandwidth part.

27 Claims, 13 Drawing Sheets

(56) References Cited

U.S. PATENT DOCUMENTS

| | | | | |
|---|---|---|---|---|
| 2021/0029688 A1* | 1/2021 | Zhang | ............... | H04W 72/0446 |
| 2021/0168814 A1* | 6/2021 | Chen | .................... | H04W 72/02 |
| 2021/0235432 A1* | 7/2021 | Zhao | ................... | H04W 72/044 |
| 2021/0336728 A1* | 10/2021 | Selvanesan | ............ | H04L 1/1896 |
| 2023/0087225 A1* | 3/2023 | Ryu | ...................... | H04L 1/1893 |
| | | | | 370/329 |
| 2023/0209576 A1* | 6/2023 | Hwang | ................... | H04W 8/26 |
| | | | | 370/329 |

\* cited by examiner

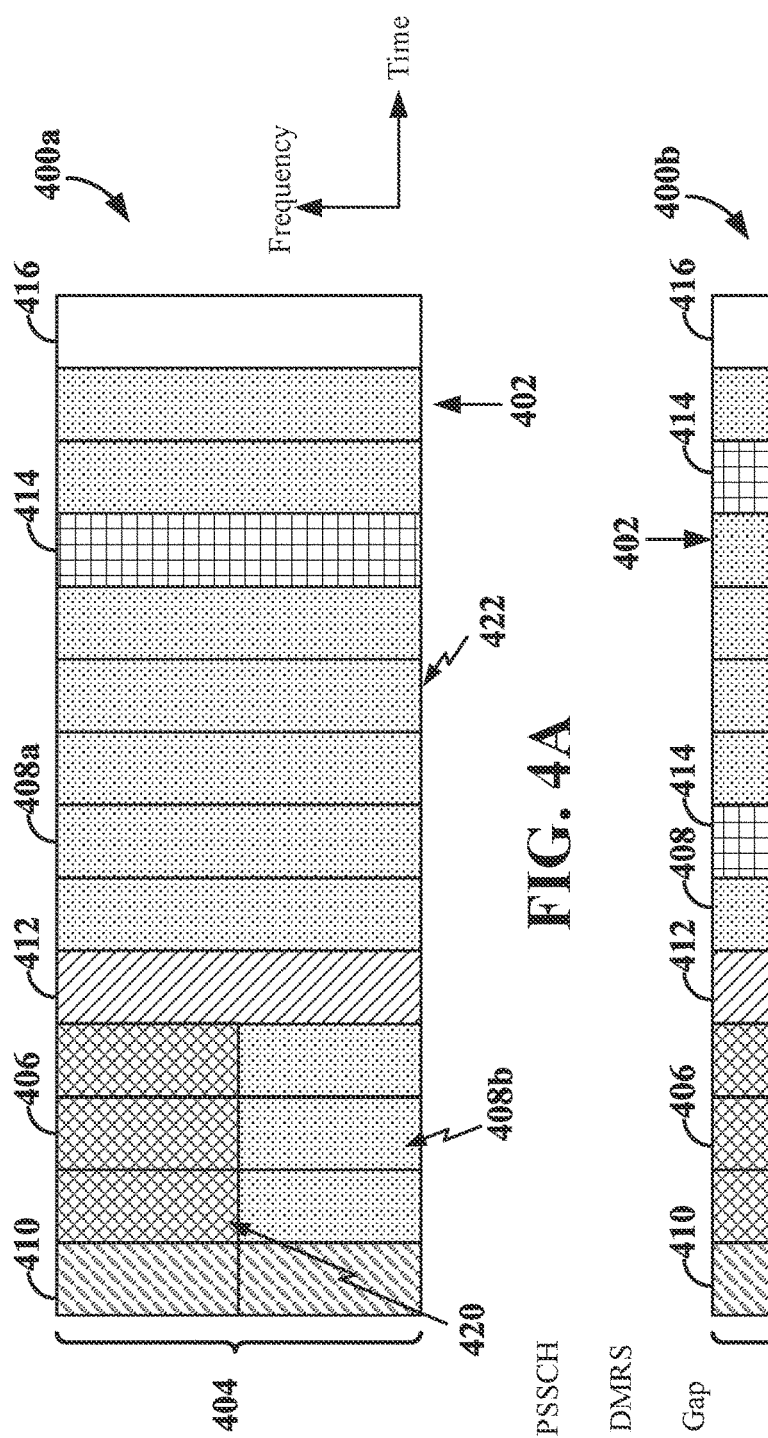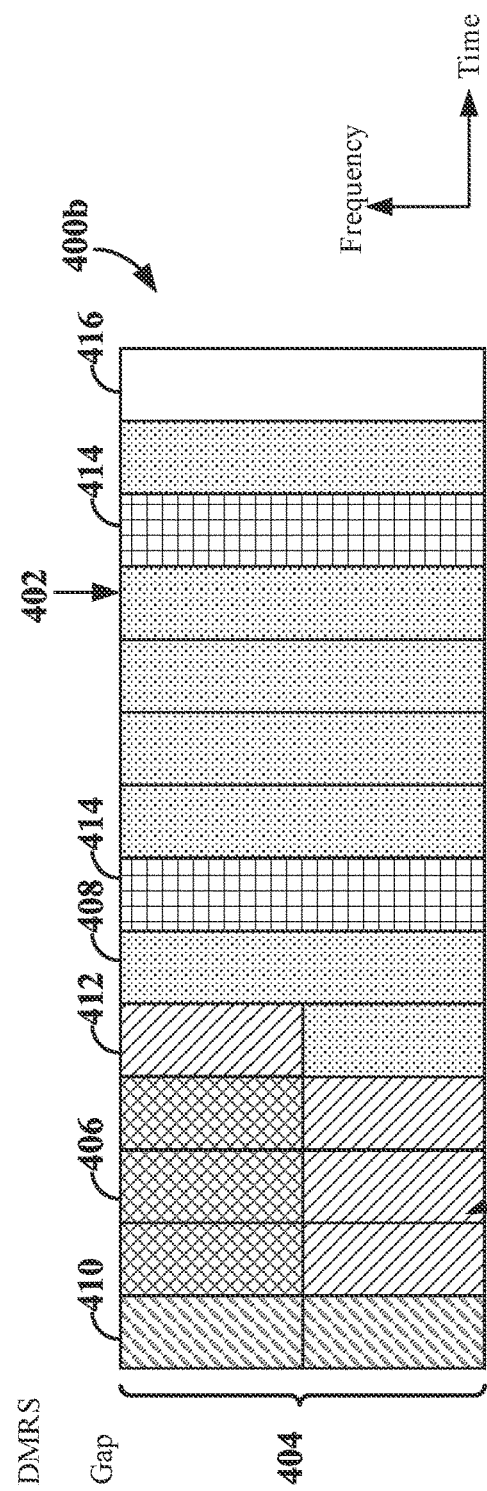

SUBCARRIER SPACING AND CYCLIC PREFIX SWITCHING IN WIRELESS COMMUNICATION

TECHNICAL FIELD

The technology discussed below relates generally to wireless communication systems, and more particularly, to flexibly switching between subcarrier spacing and cycle prefix configurations in wireless communication.

INTRODUCTION

Wireless communication systems are widely deployed to provide various telecommunication services such as telephony, video, data, messaging, and broadcasts. Technologies have been adopted in various telecommunication standards to provide a common protocol that enables different wireless devices to communicate on a municipal, national, regional, and even global level. An exemplary telecommunication standard is 5G New Radio (NR). 5G NR is part of a continuous mobile broadband evolution promulgated by Third Generation Partnership Project (3GPP) to meet new requirements associated with latency, reliability, security, scalability, and other requirements.

Two or more wireless communication devices can communicate with each other using device-to-device (D2D) sidelink communication. In NR, multiple orthogonal frequency divisional multiplexing (OFDM) numerologies can be supported for D2D sidelink communication, where the subcarrier spacing (SCS) and cyclic prefix (CP) for a sidelink (SL) bandwidth part (BWP) can be obtained from a higher-layer parameter, for example, SL-BWP. Appending a CP to the last part of an OFDM symbol can mitigate inter-symbol interference (ISI) and inter-carrier interference (ICI) due to a channel delay spread. While a longer CP can handle a larger channel delay spread, a longer CP can waste more communication resources. Furthermore, switching SCS and/or CP by switching BWP can involve significant overhead.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure provide techniques for flexibly changing subcarrier spacing (SCS) and/or cyclic prefix (CP) in wireless communication. In some aspects, the techniques can enable a wireless communication device to switch between SCS and CP configurations without changing a bandwidth part (BWP) with slot or sub-slot (symbol) level delay. The techniques allow more efficient switching between SCS and CP configurations within a resource pool under the same IMP.

One aspect of the disclosure provides an apparatus for wireless communication. The apparatus includes a transceiver, a memory, and a processor coupled to the transceiver and the memory. The processor and the memory are configured to transmit, in a first sidelink resource of a sidelink resource pool, a first sidelink transmission using a first configuration of subcarrier spacing (SCS) and cyclic prefix (CP). The processor and the memory are further configured to transmit, in a second sidelink resource of the sidelink resource pool, a second sidelink transmission using a second configuration of SCS and CP, the second configuration being different from the first configuration in terms of at least one of an SCS or a CP.

Another aspect of the disclosure provides a method for wireless communication at a user equipment. The method includes transmitting, in a first sidelink resource of a sidelink resource pool, a first sidelink transmission using a first configuration of subcarrier spacing (SCS) and cyclic prefix (CP). The method further includes transmitting, in a second sidelink resource of the sidelink resource pool, a second sidelink transmission using a second configuration of SCS and CP, the second configuration being different from the first configuration in terms of at least one of an SCS or a CP.

Another aspect of the disclosure provides an apparatus for wireless communication. The apparatus includes means for transmitting, in a first sidelink resource of a sidelink resource pool, a first sidelink transmission using a first configuration of subcarrier spacing (SCS) and cyclic prefix (CP). The apparatus further includes means for transmitting, in a second sidelink resource of the sidelink resource pool, a second sidelink transmission using a second configuration of SCS and CP, the second configuration being different from the first configuration in terms of at least one of an SCS or a CP.

Another aspect of the disclosure provides an article of manufacture including a non-transitory computer-readable medium storing computer-executable code. The computer-executable code includes code for causing an apparatus to transmit, in a first sidelink resource of a sidelink resource pool, a first sidelink transmission using a first configuration of subcarrier spacing (SCS) and cyclic prefix (CP). The computer-executable code further includes code for causing the apparatus to transmit, in a second sidelink resource of the sidelink resource pool, a second sidelink transmission using a second configuration of SCS and CP, the second configuration being different from the first configuration in terms of at least one of an SCS or a CP.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various implementations discussed herein. In similar fashion, while exemplary implementations may be discussed below as device, system, or method examples, it should be understood that such examples can be implemented in various devices, systems, and methods.

BRIEF DESCRIPTION OF THE DRAWINGS

FIGS. 4A and 4B are diagrams illustrating examples of sidelink slot structures according to some aspects.

DETAILED DESCRIPTION

Figure 1:
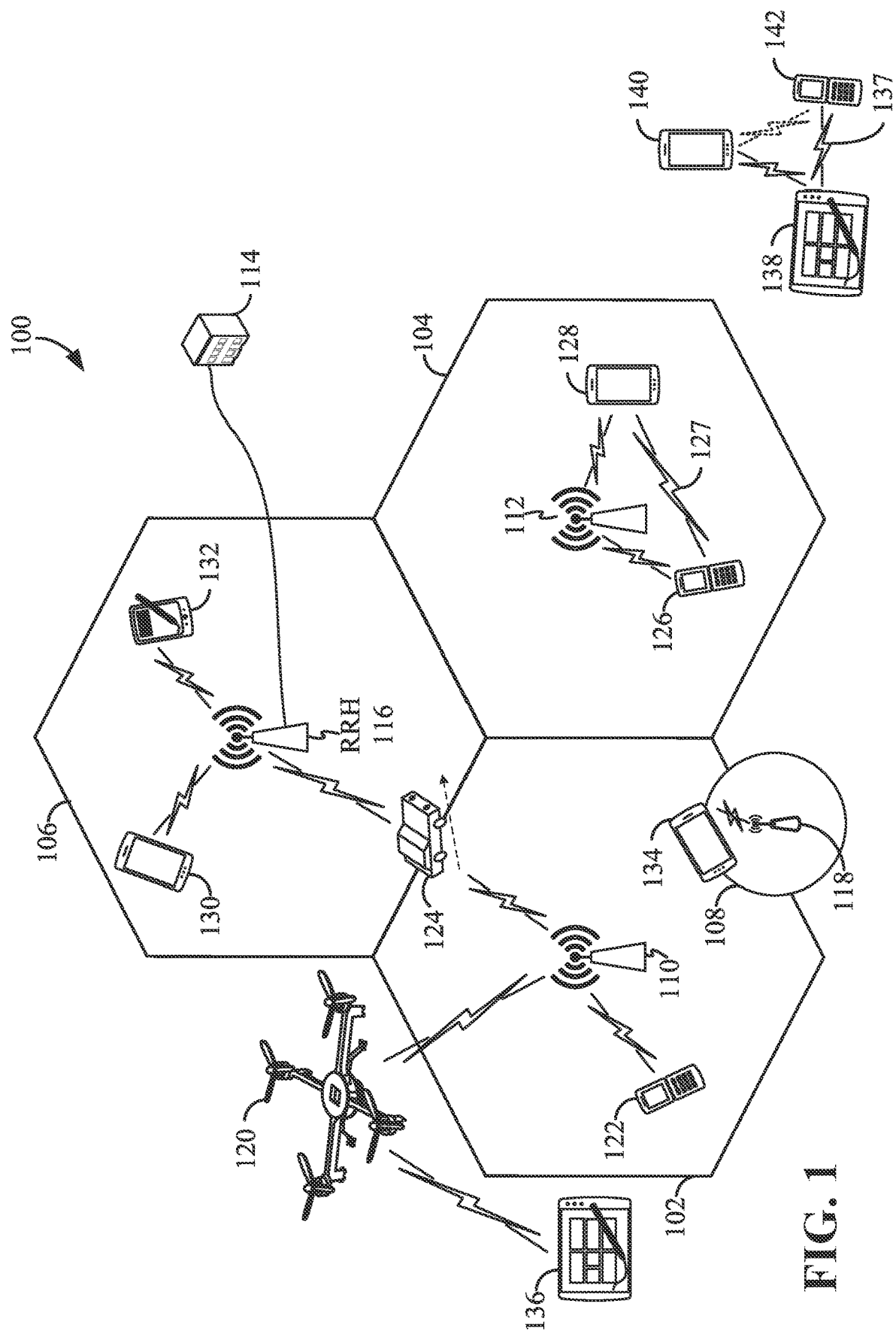
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by illustration to some examples, those skilled in the art will understand that additional implementations and use cases may come about in many different arrangements and scenarios, innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and CE), end-user devices, etc. of varying sizes, shapes and constitution.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz 52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies, Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 G-Hz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Aspects of the disclosure provide techniques for flexibly changing subcarrier spacing (SCS) and/or cyclic prefix (CP) in wireless communication. In some aspects, the techniques can enable a wireless communication device to switch between SCS and CP configurations without changing a bandwidth part (BWP) with slot or sub-slot (symbol) level delay. The techniques allow more efficient switching between SCS and CP configurations within a resource pool under the same BWP.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The radio access network (RAN) 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station, FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency hand. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells.

Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110), Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on Institute of Electrical and Electronics Engineers (IEEE) 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. White compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP), In addition, for UL transmissions, 5G NR specifications provide support for discrete Fourier transform-spread-OFDM (DFT-s-OFDM) with a CP (also referred to as single-carrier FDMA (SC-FDMA)), However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 1124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
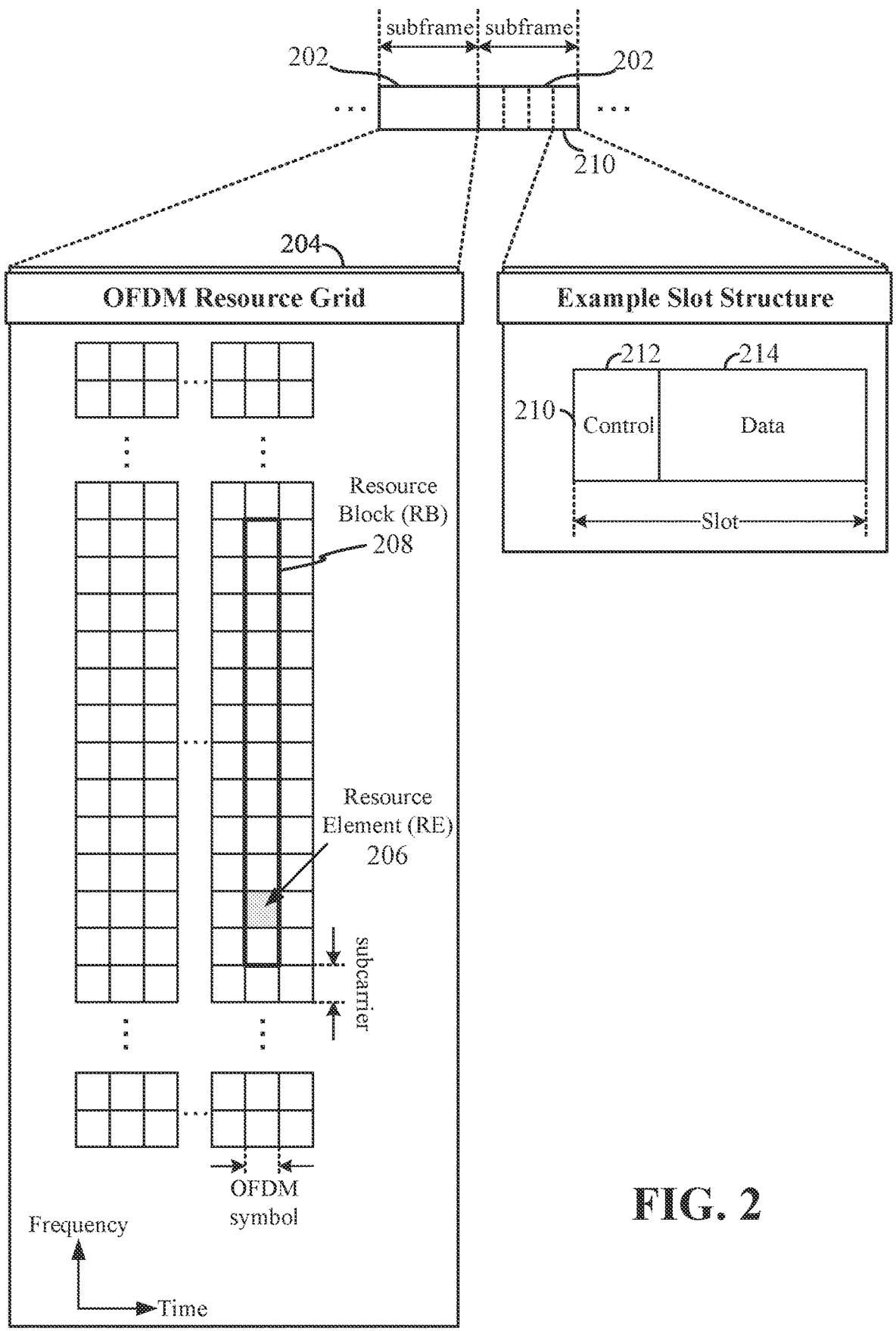
FIG. 2 is a schematic illustration of an organization of wireless resources in an air interface utilizing orthogonal frequency divisional multiplexing (OFDM) according to some aspects.

Referring now to FIG. 2, an expanded view of an exemplary subframe 202 is illustrated, showing an OFDM resource grid. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (FRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RING), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204, in some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CPC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to can other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system)

bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry LTL control information (UCI) including one or more UL control channels, such as a physical uplink control channel (PUCCH), to the scheduling entity. PCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data, traffic may be carried on one or more traffic channels, such as, for a DL transmission, a physical downlink shared channel (PUSCH); or for an UL transmission, a physical uplink shared channel (PUSCH). In some examples, one or more REs 206 within the data region 214 may be configured to carry other signals, such as one or more SIBs and DMRSs. In some examples, the PDSCH may carry a plurality of SIBs, not limited to SIB1, discussed above. For example, the other system information (OSI) may be provided in these SIBs, e.g., SIB2 and above.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE), The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210, For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
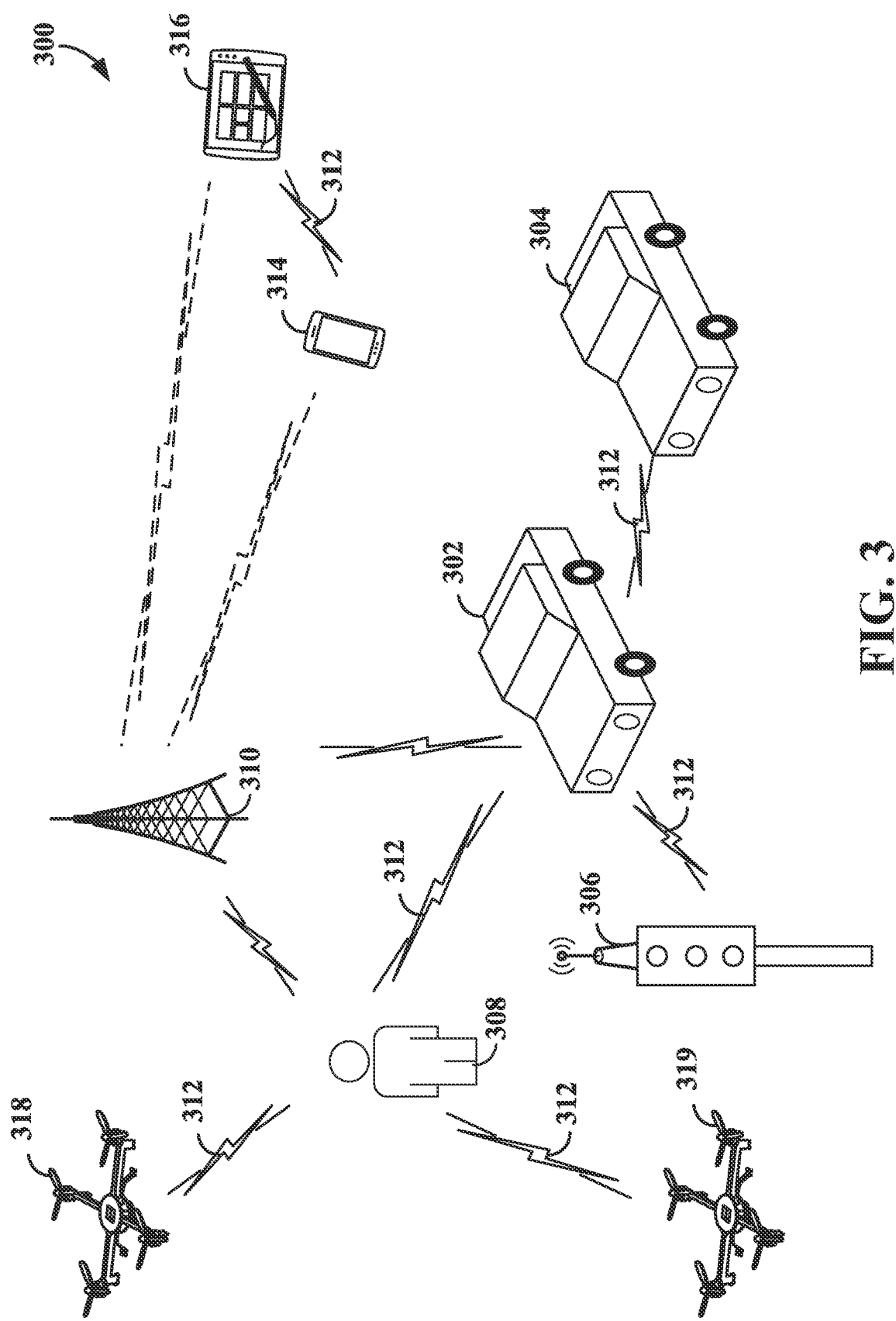
FIG. 3 is a schematic illustration of an exemplary wireless communication network configured to support device-to-device (D2D) communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16 and later, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc in case of imminent danger.

The sidelink communication between vehicle-UEs (V-UEs) 302 and 304, between a V-UE 302 or 304 and either an RSU 306 or a pedestrian-UE (P-UE) 308, or between a P-UE 308 and one or more UAVs 318 and 319 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3. ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. The number of sub-channels in a resource pool may include between one and twenty-seven sub-channels. A radio resource control (RRC) configuration of the resource pools may be either pre-configured (e.g., a factory setting on the UE determined, for example, by sidelink standards or specifications) or configured by a base station (e.g., base station 310).

In addition, there may be two main resource allocation modes of operation for sidelink PC5 communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI (e.g., DCI 3_0). In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes, Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 can indicate one or more SCS and CP configurations of sidelink resources in a sidelink resource pool. Some sidelink resources may be associated with one or more SCS and CP configurations (e.g., extended CP length) for long-range communication. SCI-1 can specify a configurable guard time (one or more symbols or slots) to provide sufficient time for a UE to reconfigure its hardware and/or software to use different SCS and CP configurations. SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2, For example, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH, According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a, and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 that schedules transmission of data traffic on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot. In some aspects, the PSCCH 406 (e.g., SCI-1) can indicate one or more SCS and CP configurations for transmitting sidelink traffic on the allocated resources. At least one of the SCS and CP configurations uses a normal or default CP, and at least one of the SCS and CP configurations uses an extended CP that can provide better ISI and ICI mitigation due to channel delay spread.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel, A DMRS may further be present in every PSCCH symbol. In some examples, the DMRS may be placed on every fourth RE of the PSCCH 406. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 4A and 4B, the starting symbol for the PSCCH 406 is the second symbol of the corresponding slot 400a or 400b and the PSCCH 406 spans three symbols 402.

The PSSCH 408 may be time-division multiplexed (TDMed) with the PSCCH 406 anti/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406, In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSCCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol. DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In addition, a gap symbol 416 is present after the PSSCH 408 in each slot 400a and 400b.

Each slot 400a and 4001 further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
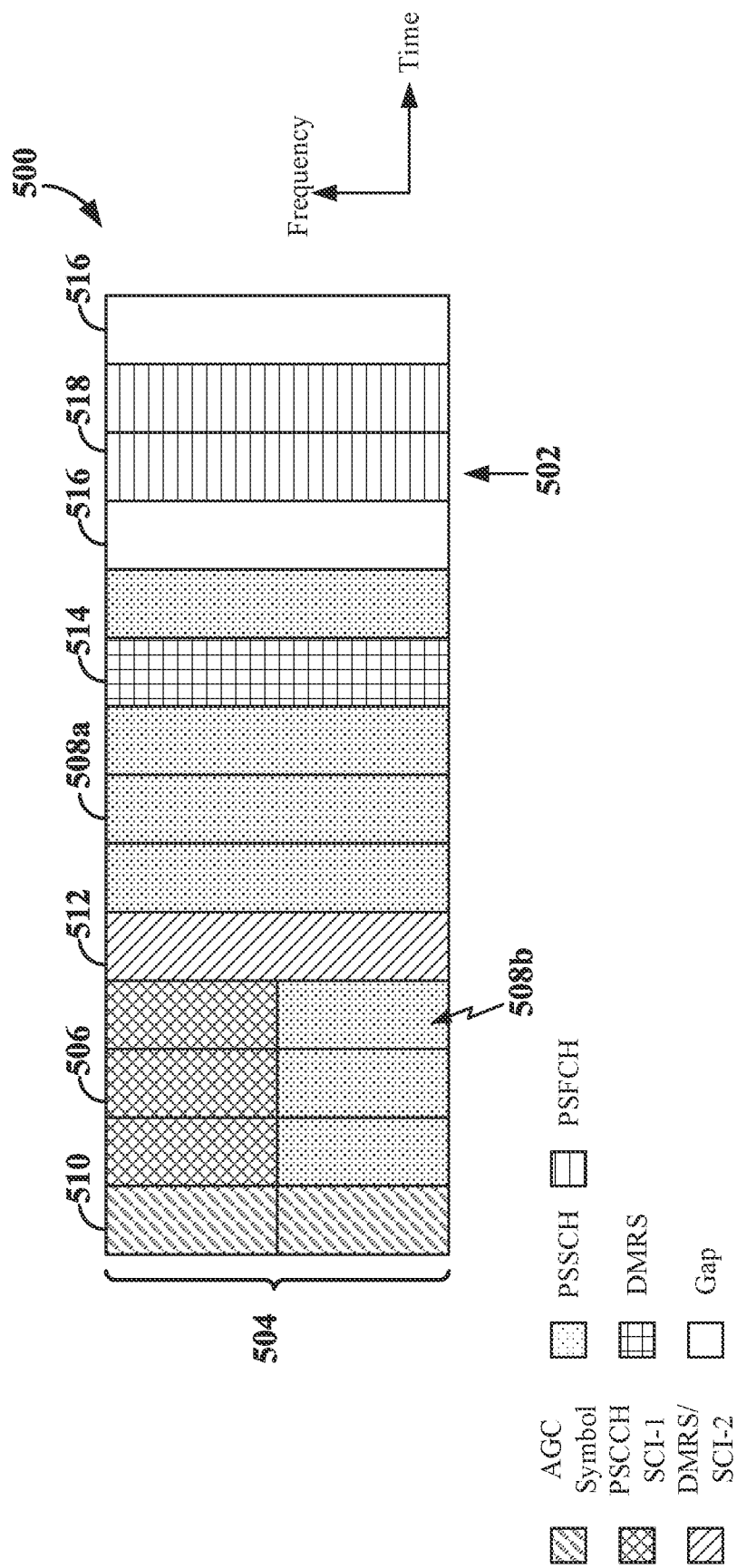
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500a. The PSCCH 506 includes, for example, SCI-1 that schedules transmission of data traffic on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 5086 that is FDMed with the PSCCH 506.

The PSSCH 508 may further include a DMRSs 514 configured in a two, three, or four symbol DMRS pattern.

For example, slot 500 shown in FIG. 5 illustrates a two symbol. DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500, in addition, a gap symbol. 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508*b* may be transmitted on both the first symbol and the second symbol.

HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500*c*. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

In OFDM, to maintain orthogonality of the subcarriers or tones, the subcarrier spacing may be equal to the inverse of the symbol period. A numerology of an OFDM waveform refers to its particular subcarrier spacing (SCS) and cyclic prefix (CP) overhead. A scalable numerology refers to the capability of the network or device to select different subcarrier spacings, and accordingly, with each spacing, to select the corresponding symbol duration, including the CP length. With a scalable numerology, a nominal or normal SCS may be scaled upward or downward by integer multiples. In this manner, regardless of CP overhead and the selected SCS, symbol boundaries May be aligned at certain common multiples of symbols (e.g., aligned at the boundaries of each 1 ms subframe). The range of SCS may include any suitable SCS.

Figure 6:
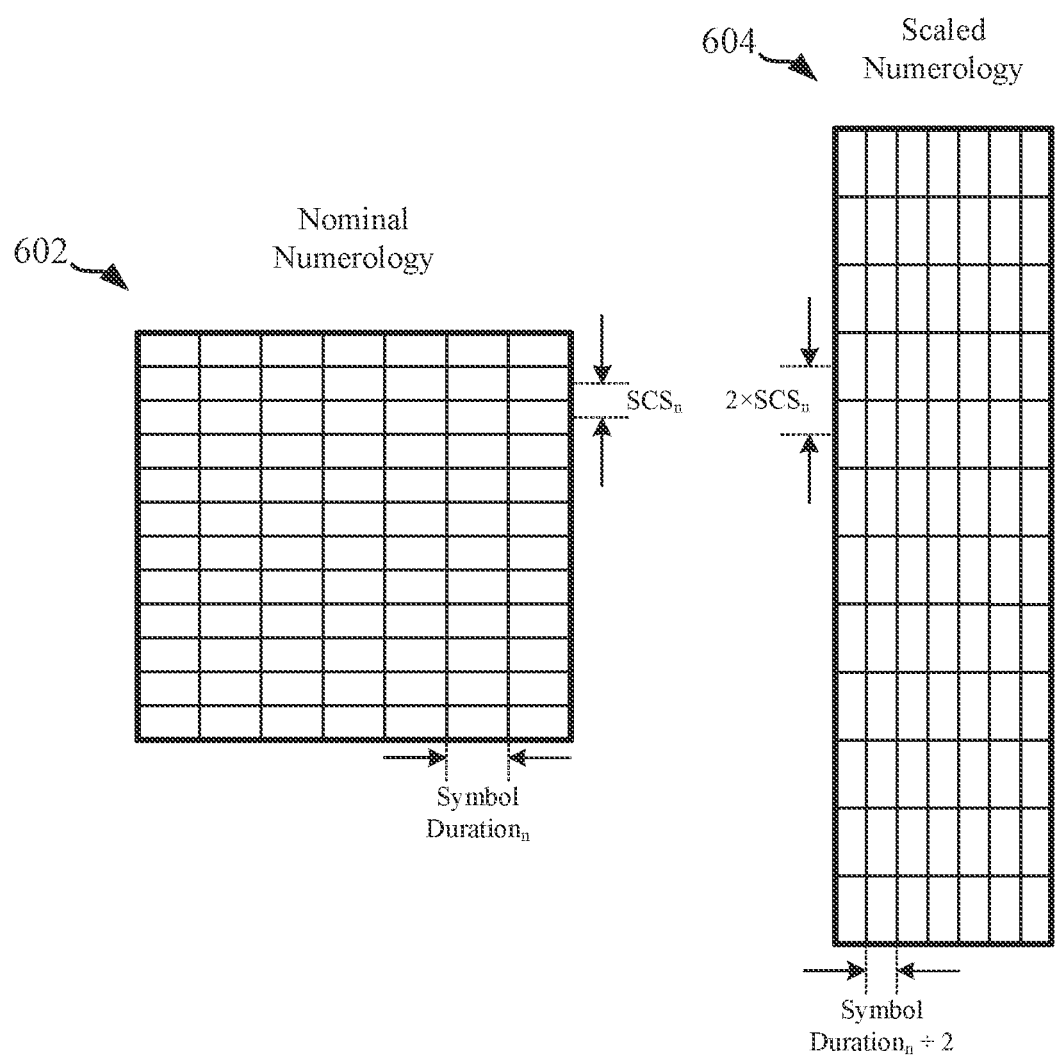
FIG. 6 is a schematic illustration of exemplary scalable OFDM numerologies according to some aspects.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_n$ of 333 µs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2=167 µs.

In NR, sidelink communication can support multiple numerologies. For example, 15 kHz, 30 kHz, 60 kHz, and 120 kHz SCS can be supported with normal CP, and 60 kHz SCS can also be supported with extended CP. In NR, the numerology configuration is part of the sidelink (SL) BWP configuration that can define one or more BWPs for sidelink, and the same SL BWP can be used for transmission and reception. In some aspects, SL BWP can be defined separately, and have separate configuration signaling, from Uu BWP, In some aspects, the same SL. BWP can support different SCS and CP configurations, for example, normal CP and extended CP.

OFDM based systems, after each symbol is formed for transmission, a CP is appended to each OFDM symbol. Appending the CP to the last part of the OFDM symbol can mitigate inter-symbol interference (ISI) and inter-carrier interference (ICI). In OFDM communication, the subcarriers are designed to be orthogonal to each other, and ICI can occur when subcarriers lose orthogonality, for example, due to delay spread of the radio channel exceeding the CP length. In some cases, the distance between sidelink devices can become very large, resulting in a large delay spread. In one example, a UE (e.g., P-UE 308) can receive SL transmissions from UAVs (e.g., drones) 318 and 319 at a large distance, ICI can occur at the P-UE 308 between the transmissions from the first UAV 318 and the second UAV 319, respectively, when the channel delay spread exceeds the CP length.

In some aspects, different SCS and CP configurations or numerologies can be used to improve the reliability and range of sidelink communication, for example, PSCCH and/or PSSCH transmissions even at a larger communication distance. While switching different SCS/CP combinations can be performed by switching SL BWPs for sidelink communication, SL BWP switching operations can involve significant overhead and delay, resulting in resource wastage. For example, more than one SL BWPs can be configured (e.g., in SL-FreqConfig or SL-FreqConfigCommon IE) on one carrier frequency or BW for SL communication using different SCS and CP configurations or numerologies. However, BWP switching may not be an efficient solution because BWP switching involves a certain delay that can be in multiple of slots. In some examples, hardware delay of switching SCS/CP can be in the order of symbol times, not in multiple of slots. Hence, the switching between SCS/CP configurations or numerologies using BWP switching can cause significant wastage of SL resources.

Aspects of the disclosure provide techniques for changing SCS and/or CP in sidelink communication without involving BWP switching. In some aspects, the techniques can flexibly change SCS and/or CP with slot or sub-slot (symbol) level delay. Therefore, SCS/CP can be changed within a sidelink resource pool in the same SL BWP.

Figure 7:
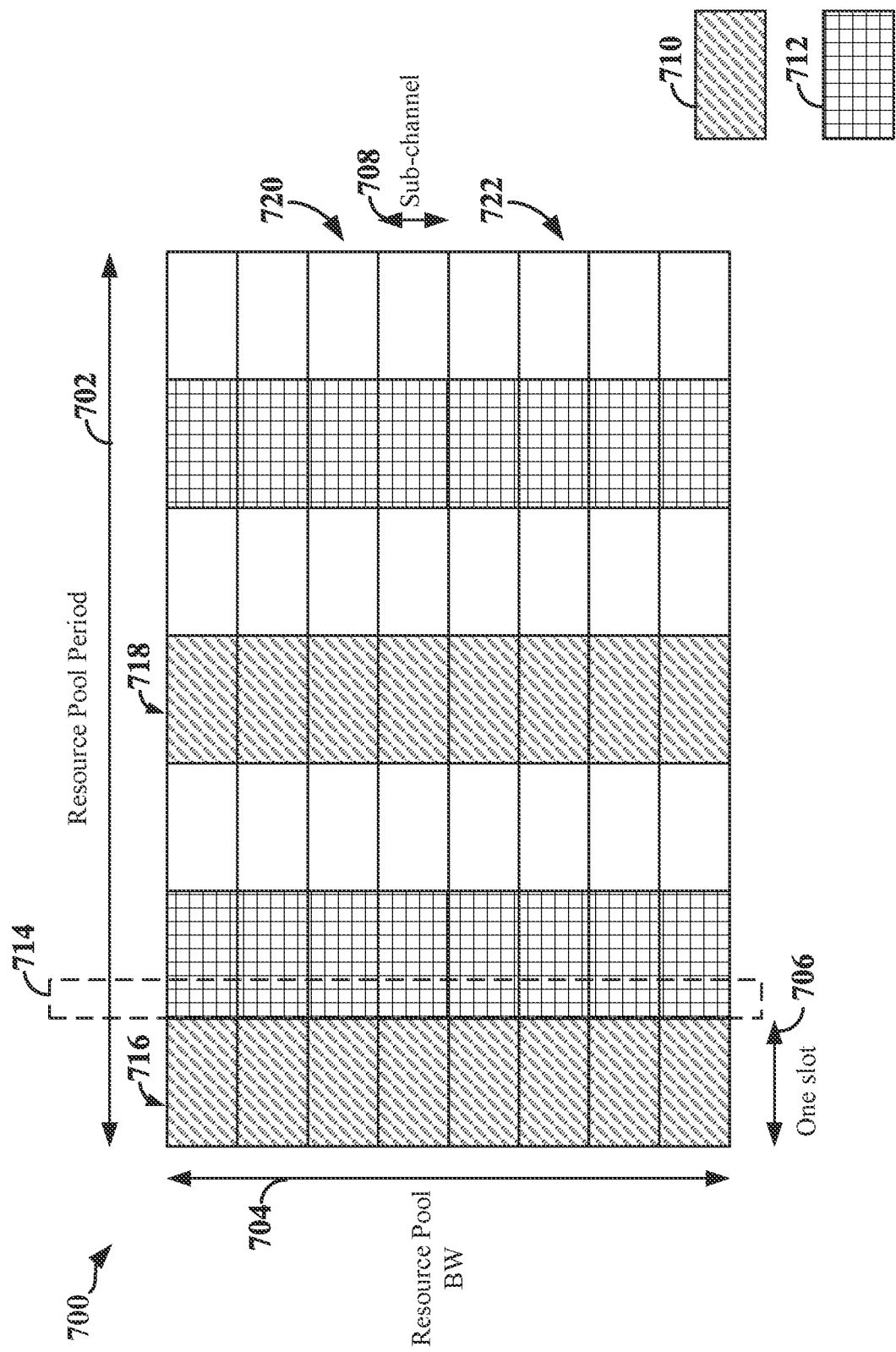
FIG. 7 is a drawing illustrating a first exemplary resource pool that can be used for sidelink communication using different subcarrier spacing (SCS) and cyclic prefix (CP) configurations according to some aspects.

FIG. 7 is a drawing illustrating a first exemplary resource pool 700 that can be used for sidelink communication using different SCS and CP configurations according to some aspects of the disclosure. In one example, the resource pool 700 can be indicated in sidelink resource pool information element (e.g., sl-resourcepool) that specifies the different configurations of SCS and CP that can be used in the resource pool 700. The sidelink resource pool configuration can be configured by a base station (e.g., gNB) or preconfigured.

In some examples, a UE (e.g., P-UE 308) can use the resource pool 700 to perform sidelink communication with another sidelink device using different SCS and CP configurations or numerologies without changing the current BWP. In this example, the resource pool 700 provides a plurality of communication resources within a resource pool period 702 and a resource pool bandwidth (BW) 704, in some examples, the resource pool BW may include multiple SL BWPs. One SL BWP is shown in FIG. 7. The resource pool period can span a plurality of time slots 706 and the resource pool BW extends across a plurality of SL sub-channels 708.

In one example, a LT can use a first resource (e.g., one or more resources 710) for SL communication using a first configuration of SCS and CP (e.g., first SCS/CP configuration), and use a second resource (e.g., one or more resources 712) for SL communication using a second configuration of SCS and CP (e.g., second SCS/CP configuration). In one example, the first SCS/CP configuration may use a normal or default CP length, and the second SCS/CP configuration may use an extended CP length (i.e., longer than the normal default CP length) suitable for range communication. A UE can flexibly switch between different SCS/CP configurations in different slots and/or sub-channels in the resource pool period 702 of the resource pool 700, while still using the same SL BWP. When a UE switches between different SCS and CP configurations, a configurable guard time 714 (e.g., one or more symbols/slots) may be used to provide sufficient time for the UE to reconfigure its hardware and/or software to use the new SCS/CP for sidelink communication. With the above-described resource pool 700, the UE can transmit sidelink signals using different SCS/CP configurations in different time slots (e.g., slots 716 and 718) and/or sub-channels (e.g., sub-channels 720 and 722). For example, the UE can use a default SCS/CP configuration with a set of resources of the resource pool 700 and switch to a non-default or special SCS/CP configuration (e.g., extended CP) with a different set of resources of the resource pool 700 to mitigate ISI/ICI in longer-range communication that may experience a larger channel delay spread. In one aspect, the UE can indicate the SCS/CP configuration in PSCCH/SCI, In one aspect, each resource of the resource pool is associated with a preconfigured SCS/CP configuration, and the receiving UE can determine the SCS/CP configuration in use based on the resources used for receiving the sidelink transmission.

Figure 8:
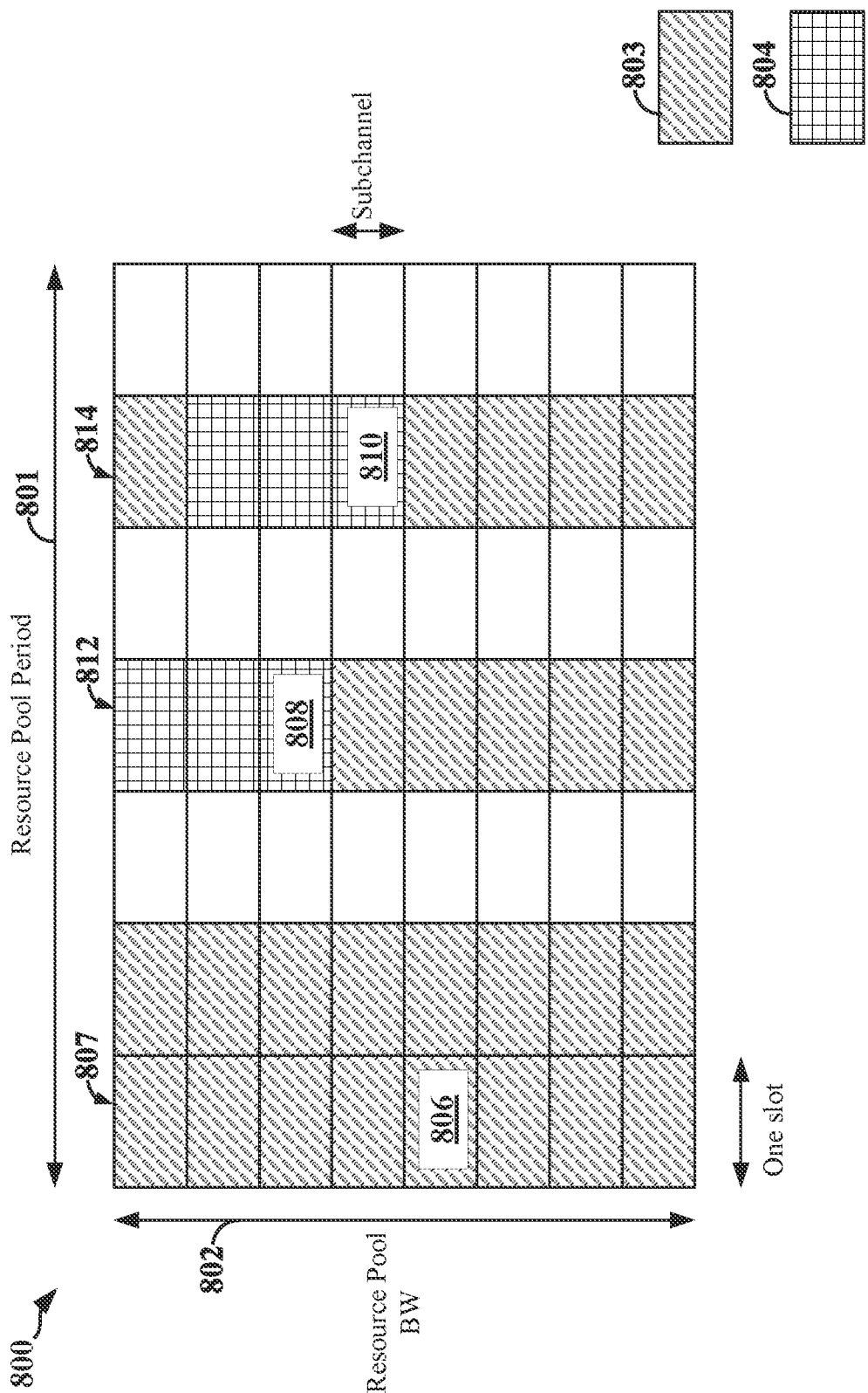
FIG. 8 is a drawing illustrating a second exemplary resource pool that can be used for sidelink communication using different SCS and CP configurations according to some aspects.

FIG. 8 is a drawing illustrating a second exemplary resource pool 800 that can be used for sidelink communication using different SCS/CP configurations in different sub-channels according to some aspects. In one example, the resource pool 800 can be specified in a sidelink resource pool information element (e.g., sl-resourcepool) that specifies the different configurations of SCS and CP that can be used in the resource pool 800 for sidelink communication. The sidelink resource pool configuration can be configured by a base station (e.g., gNB) or preconfigured.

In some examples, a UE (e.g., P-UE 308) can use resources in the resource pool 800 to perform wireless communication (e.g., sidelink/PC5) with another wireless device (e.g., UAV 318 or vehicle 302) using different SCS/CP configurations or numerologies without changing BWP, In this example, the resource pool 800 provides a plurality of communication resources within a resource pool period 801 and a resource pool BW 802. In some examples, the resource pool BW may include multiple SL BWPs. One SL BWP is shown in FIG. 8. For example, the resource pool 800 can provide a first set of resources 803 for SL communication using a first SCS/CP configuration, and a second set of resources 804 for SL communication using a second SCS/CP configuration. The SCS/CP configurations are different in terms of SCS and/or CP In one example, the second SCS/CP configuration may use an extended CP that is longer than a normal CP used in the first SCS/CP configuration.

In one example, a UE can select a first resource 806 to transmit a first sidelink transmission using the first SCS/CP configuration. For example, the first sidelink transmission can include a PSCCH that schedules a PSSCH in the same slot 807 to be transmitted using the first SCS/CP configuration (e.g., normal CP or default CP). The PSCCH (e.g., SCI) can reserve one or more future resources (e.g., second resources 808 and 810) for transmitting a second sidelink transmission (e.g., PSCCH and/or PSSCH) using the second SCS/CP configuration (e.g., extended CP). For example, the SCI can indicate the resources for use with the second SCS/CP configuration in slots 812 and 814. With the above-described resource pool 800, the UE can transmit sidelink signals using different SCS/CP configurations in different time slots and/or sub-channels. In other examples, the UE can switch between different SCS/CP configurations flexibly in different slots without changing or reconfiguring BWP.

Figure 9:
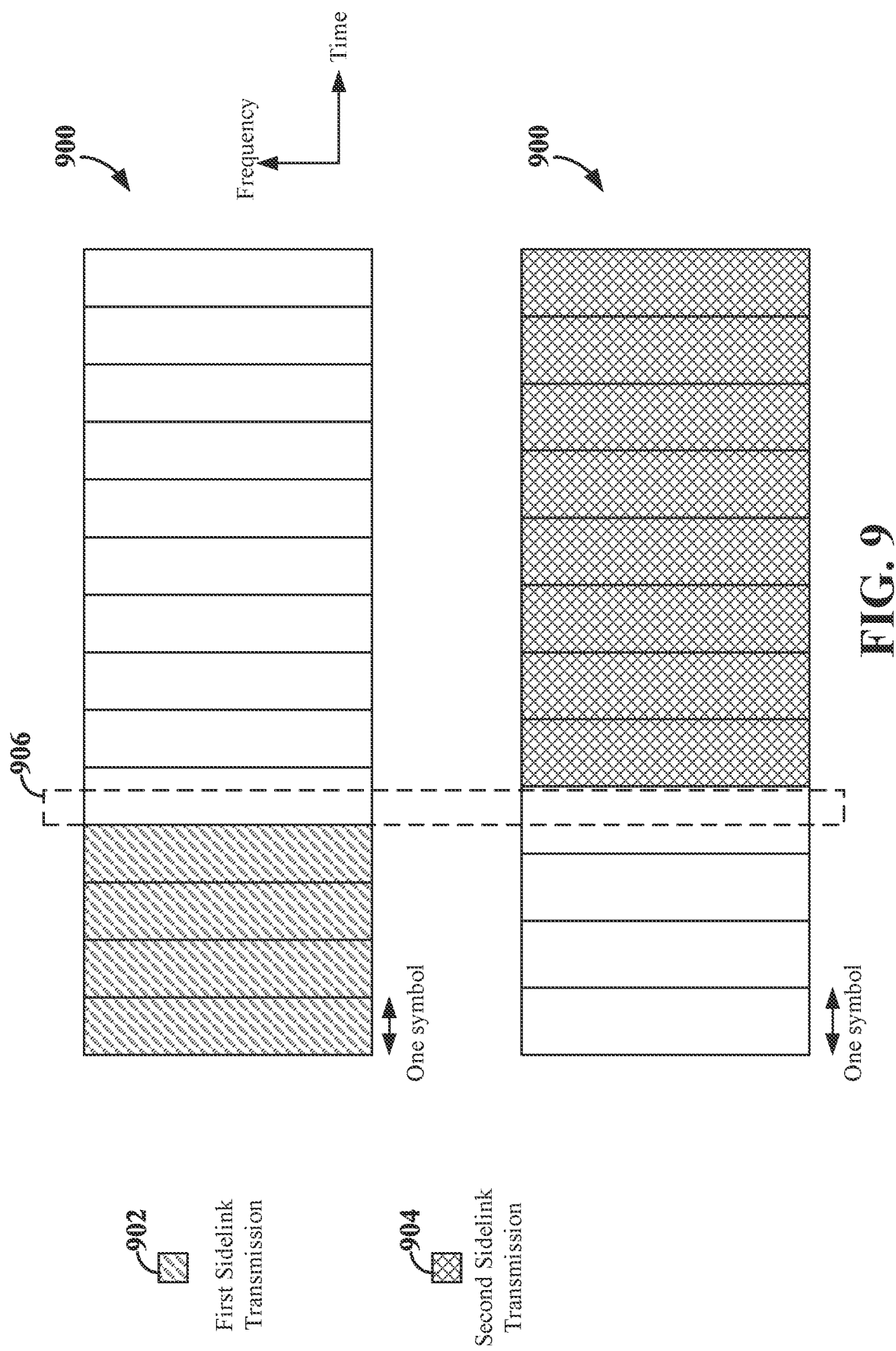
FIG. 9 is a diagram illustrating an example of switching between SCS and CP configurations within a slot according to some aspects.

FIG. 9 is a diagram illustrating an example of switching between SCS/CP configurations within a slot 900 according to some aspects of the disclosure. For example, a UE (e.g., P-UE 308 or UAV) can select a resource in a resource pool (e.g., resource pool 700 or 800) for sidelink communication. The selected sidelink resource may have a default SCS/CP configuration. In one example, the slot 900 may have 14 symbols according to the default SCS/CP configuration or default numerology.

In one example, the UE can transmit a first sidelink transmission 902 using the default SCS/CP configuration in a portion (e.g., first four symbols) of the slot 900. In this case, the CP may be a normal or default CP according to the default SCS/CP configuration. Within the same slot 900, the UE can switch to a different SCS/CP configuration or numerology. For example, the UE can switch to the new SCS/CP configuration when the distance between the UE and the receiving wireless device is greater than a predetermined threshold distance. In one aspect, the threshold distance is preconfigured (e.g., by the original equipment manufacturer (OEM) based on one or more standards or specifications). In another aspect, the threshold distance may be configured by a base station serving the location within which the UE is located. After switching the SCS/CP configuration, the slot 900 has 12 symbols (i.e., different numerology) with an extended CP (i.e., longer than the normal CP). The UE can transmit a second sidelink transmission 904 in the remaining portion of the slot 900 using the new SCS/CP configuration after a time gap 906. The time gap 906 enables the UE to reconfigure its hardware and/or software to use the new SCS/CP configuration. In one example, the time gap 906 may be less than 1 symbol in time. In one example, the time gap 906 may be one or more symbols in time. In some aspects, the first sidelink transmission 902 may include a PSCCH and a first PSSCH. The SCI of the first PSSCH can indicate the new SCS/CP configuration for the transmission of the second sidelink transmission 904 (e.g., a second PSSCH) in the remaining portion of the slot 900. Thus, the UE can change its SCS/CP configuration within the same slot such that the UE can flexibly select an SCS and/or CP with a symbol (or sub-slot) level granularity. For example, the UE can use a longer or extended CP for long range communication and a normal CP for shorter or normal range communication. In one example, the UE can use a longer or extended CP for sidelink data traffic (e.g., PSSCH) and a normal CP for sidelink control traffic (e PSCCH).

Figure 10:
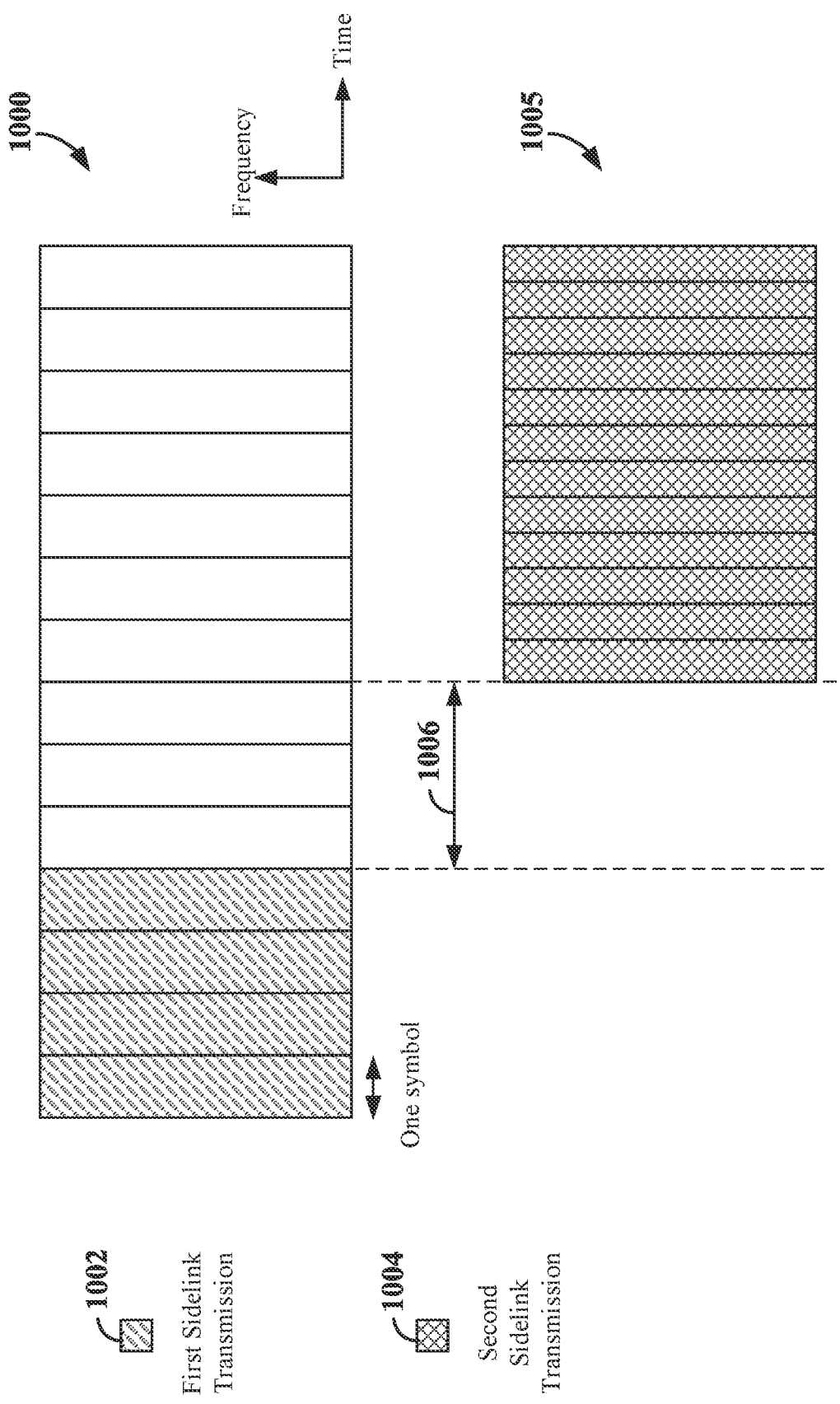
FIG. 10 is a diagram illustrating another example of switching between SCS and CP configurations within a slot according to some aspects.

FIG. 10 is a diagram illustrating another example of switching between SCSI CP configurations within a slot 1000 according to some aspects of the disclosure. For example, a UE (e.g., P-UE 308 or UAV) can select a resource in a resource pool (e.g., resource pool 700 or 800) for sidelink communication. The selected sidelink resource may have a default SCS/CP configuration (e.g., with a normal or default CP). In one example, the slot 1000 may have 14 symbols according to the default SCS/CP configuration or default numerology.

The UE can transmit a first sidelink transmission 1002 using the default SCS/CP configuration in a first portion (e.g., first four symbols) of the slot 1000. In this case, the CP may be a normal CP or default CP according to the default SCS/CP configuration. In one example, the first sidelink transmission 1002 may include PSCCH/PSSCH. Within the same slot 1000, the UE can switch to a different SCS/CP configuration or numerology. In one example, the UE can switch to a new SCS/CP configuration (e.g., with an extended CP) when the UE determines that the distance between the UE and the receiving sidelink device is greater than a threshold distance. In one example, the UE can switch to a new SCS/CP configuration (e.g., with an extended CP) based on the type of sidelink traffic. For example, the UE may use the default SCS/CP configuration for sidelink control traffic (e.g., PSCCH), and use a different SCS/CP configuration (with an extended CP) for sidelink data traffic (e.g., PSSCH).

In one example, the slot 1000 has a different SCS/slot duration with 12 symbols and an extended CP according to the new configuration of SCS and CP The UE can transmit a second sidelink transmission 1004 in the retraining symbols 1005 of the slot using the new configuration of SCS and CP after a time gap 1006. The time gap 1006 may be less than 1 symbol in time or one or more symbols in time. The time gap 1006 enables the UE to reconfigure the UE's hardware and/or software to use the new SCS and/or CP for sidelink communication. In this example, the remaining symbols 1005 are slot-aligned with the slot boundary of the slot 1000.

In some aspects, the first sidelink transmission 1002 may include a PSCCH and a first PSSCH. The SCI in the first PSSCH can indicate the change of SCS and/or CP for the transmission of the second sidelink transmission 1004 (e.g., a second PSSCH) in the remaining part of the slot 1000. The above-described process of FIG. 10 enables the UE to change SCS and/or CP within the same slot such that the UE can flexibly select an SCS/CP configuration in a symbol (or sub-slot) level granularity. For example, the UE use a longer or extended CP for long-range communication and a normal CP for shorter or normal range communication.

Figure 11:
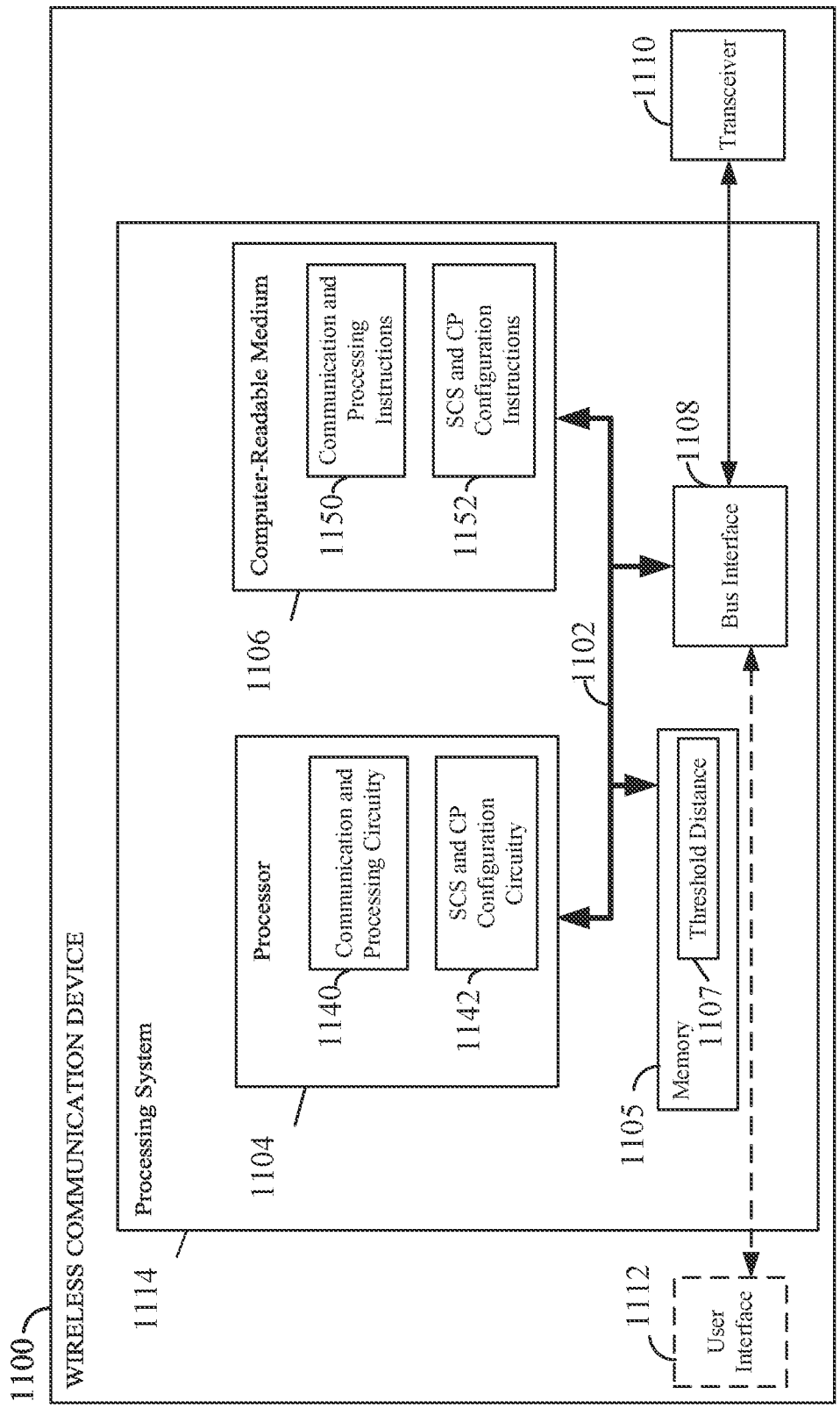
FIG. 11 is a block diagram conceptually illustrating an example of a hardware implementation for a scheduled entity according to some aspects.

FIG. 11 is a block diagram illustrating an example of a hardware implementation for a wireless communication device 1100 employing a processing system 1114. For example, the wireless communication device 1100 may be a user equipment (UE) as illustrated in any one or more of FIGS. 1 and/or 3.

The wireless communication device 1100 may be implemented with a processing system 1114 that includes one or more processors 1104, Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in a wireless communication device 1100, may be used to implement any one or more of the processes and procedures described below and illustrated in FIG. 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseball modem processor can be used in implementations, including RF-chains, power amplifiers, modulators, buffers, interleavers, adder/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 provides a communication interface or means for communicating with various other apparatus over a transmission medium. Depending upon the nature of the apparatus, a user interface 1112 (e.g., keypad, display, speaker, microphone, joystick) may also be provided. Of course, such a user interface 1112 is optional, and may be omitted in some examples, such as a base station.

The processor 1104 is responsible for managing the bus 1102 and general processing, including the execution of software stored on the computer-readable medium 1106, which is an article of manufacture. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions, including, for example, changing SCS/CP configurations without changing BWP in wireless communication. For example, the circuitry may be configured to implement one or more of the functions described below in relation to FIG. 12.

In some aspects of the disclosure, the processor 1104 may include communication and processing circuitry 1140 configured for various functions, including for example communicating with a scheduling entity (e.g., gNB or base station), or any other entity, such as, for example, a scheduled entity (e.g., UE). In some examples, the communication and processing circuitry 1141 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1140 may include one or more transmit/receive chains. In addition, the communication and processing circuitry 1140 may be configured to transmit and process uplink traffic and uplink control messages, receive and process downlink traffic and downlink control messages. In addition, the communication and processing circuitry 1140 may be configured to transmit/receive and process sidelink traffic and messages (e.g., similar to those described above in FIGS. 3-5). The communication and processing circuitry 1140 may further be configured to execute communication and processing instructions (software) 1150 stored on the computer-readable medium 1106 (e.g., an article of manufacture) to implement one or more functions described herein.

In some implementations where the communication involves receiving information, the communication and processing circuitry 1140 may obtain information from a component of the wireless communication device 1100 (e.g., from the transceiver 1110 that receives the information via radio frequency signaling or some other type of signaling suitable for the applicable communication medium), process (e.g., decode) the information, and output the processed information. For example, the communication and processing circuitry 1140 may output the information to another component of the processor 1104, to the memory 1105, or to the bus interface 1108. In some examples, the communication and processing circuitry 1140 may receive one or more of signals, messages, other information, or a combination thereof. In some examples, the communication and processing circuitry 1140 may receive information via one or more channels. In some examples, the communication and processing circuitry 1140 may include functionality for a means for receiving. In some examples, the communication and processing circuitry 1140 may include functionality for a means for processing, including a means for demodulating, a means for decoding, etc.

In some implementations where the communication involves sending (e.g., transmitting) information, the communication and processing circuitry 1140 may obtain information (e.g., from another component of the processor 1104, the memory 1105, or the bus interface 1108), process (e.g., modulate, encode, etc.) the information, and output the processed information. For example, the communication and processing circuitry 1140 may output the information to the transceiver 1110 (e.g., that transmits the information via radio frequency signaling or some other type of signaling suitable for the applicable communication medium). In some examples, the communication and processing circuitry 1140 may send one or more of signals, messages, other information, or any combination thereof. In some examples, the communication and processing circuitry 1140 may send information via one or more channels. In some examples, the communication and processing circuitry 1140 may include functionality for a means for sending (e.g., a means for transmitting). In some examples, the communication and processing circuitry 1140 may include functionality for a means for generating, including a means for modulating, a means for encoding, etc.

In some aspects of the disclosure, the processor 1104 may include SCS and CP configuration circuitry 1142 configured for various functions used to configure and change SCS and CP used in wireless communication (e.g., sidelink communication). In one example, the SCS and CP configuration circuitry 1142 can be configured to flexibly change SCS and/or CP without changing a BWP used for the communication. In one example, the SCS and CP configuration circuitry 1142 can change SCS and/or CP per slot, for example, using a normal CP in a first slot and an extended CP in a second slot. In one example, the SCS and CP configuration circuitry 1142 can change SCS and/or CP within a slot (e.g., sub-slot or symbol level change). In one example, the SCS and CP configuration circuitry 1142 can use specific sub-channels for sidelink transmission in an SCS/CP configuration (e.g., extended CP) different from a default SCS/CP configuration (e.g., normal CP). In one example, the SCS and CP configuration circuitry 1142 can reserve, in a current slot, future slot(s) for sidelink communication using an SCS/CP configuration that is different from the current slot. The SCS and CP configuration circuitry 1142 may further be configured to execute SCS and CP configuration instructions (software) 1152 stored on the computer-readable medium 1106 to implement one or more functions described herein. The SCS and CP configuration circuitry 1142 may use a threshold distance 1107 stored in memory 1105 to determine when to switch between SCS and CP configurations.

Figure 12:
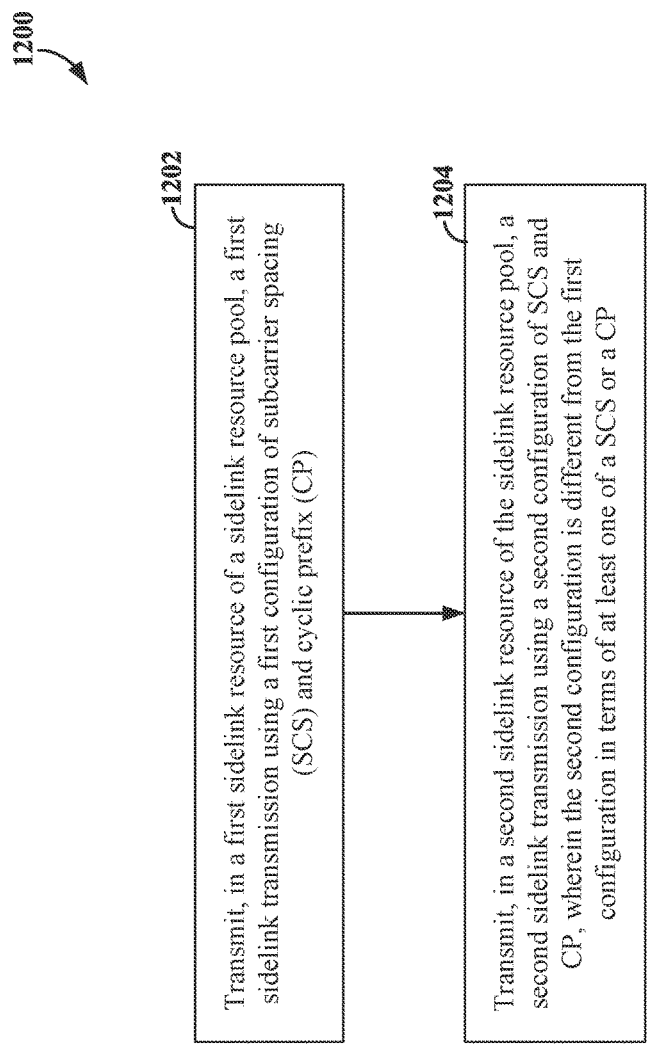
FIG. 12 is a flow chart illustrating an exemplary process for flexibly switching between SCS and CP configurations in wireless communication according to some aspects.

FIG. 12 is a flow chart illustrating an exemplary process 1200 for flexibly changing SCS and CP configuration in wireless communication in accordance with some aspects of the present disclosure. As described below, some or all illustrated features may be omitted in a particular implementation within the scope of the present disclosure, and some illustrated features may not be required for implementations. In some examples, the process 1200 may be carried out by the wireless communication device 1100 illustrated in FIG. 11. In some examples, the process 1200 may be carried out by any suitable apparatus or means for carrying out the functions or algorithm described below.

At block 1202, a UE can transmit, in a first sidelink resource of a sidelink resource pool, a first sidelink transmission using a first configuration of SCS and CP. For example, the sidelink resource pool can be the response pool 700 or 800 that can provide a plurality of communication resources usable for sidelink communication. The first configuration of SCS and CP may be a default configuration for sidelink communication using a default SCS (e.g., 30 kHz) and a normal CP. In some examples, a first set of resources of the sidelink resource pool are configured for sidelink communication using the default configuration, and a second set of resources of the sidelink resource pool are configured for sidelink communication using non-default configuration of SCS and CP. In one example, the communication and processing circuitry 1140 can provide a means to transmit the first sidelink transmission using the first configuration of SCS and CP.

At block 1204, the UE can transmit, in a second sidelink resource of the sidelink resource pool, a second sidelink transmission using a second configuration of SCS and CP. The second configuration is different from the first configuration in terms of at least one of an SCS or a CP. In one example, the communication and processing circuitry 1140 can provide a means to transmit the second sidelink transmission using the second configuration of SCS and CP. In one example, the second configuration may have a different numerology, SCS, and/or CP from the first configuration of SCS and CP. In one example, the second configuration may have an SCS that is different from the default SCS of the first configuration of SCS and CP. In one example, the second configuration may have a CP (e.g., extended CP) that is different from the default CI of the first configuration of SCS and CP. In one example, the SCS and CP configuration circuitry 1142 can provide a means to switch between the different configurations of SCS and CP.

In some aspects, the second configuration of SCS and CP enables the UE to use an extended CP when the distance between the UE and another wireless communication device becomes larger than a predetermined threshold. In one aspect, the UE can switch from the first configuration to the second configuration of SCS and CP in a slot level or sub-slot (symbol) level in the same resource pool without changing BWP. In some aspects, the UE may decide to switch between different configurations of SCS and CP based on the data traffic type of the communication. For example, the UE can use a configuration (e.g., with an extended CP) better suited for long range communication when the transmission includes data channel traffic (e.g., PSSCH), and the UE can use a default configuration (e.g., with a normal CP) when the transmission includes control channel traffic (e.g., PSCCH).

Figure 13:
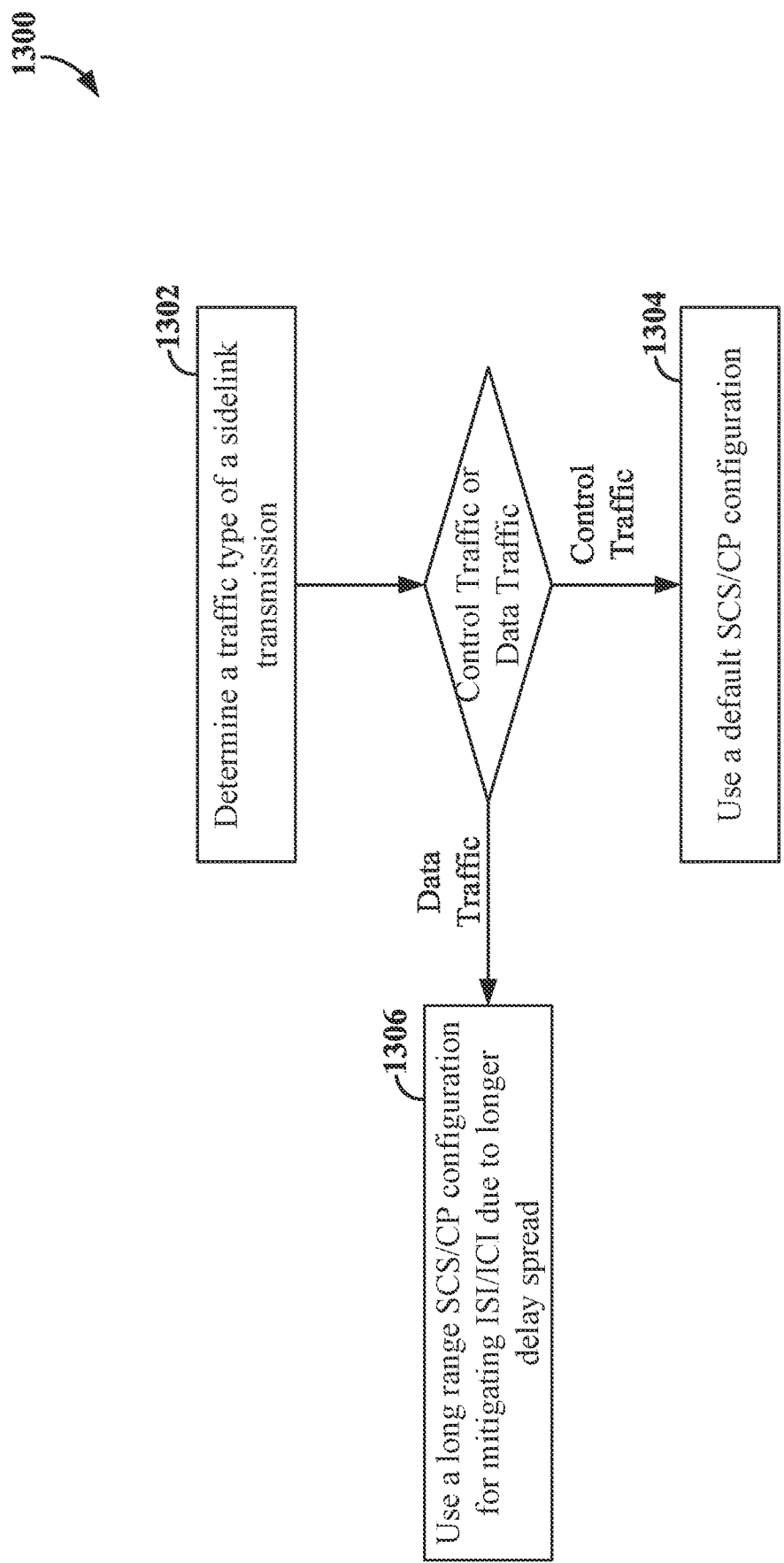
FIG. 13 a flow chart illustrating an exemplary process for determining an SCS and CP configuration for wireless communication according to some aspects.

FIG. 13 is a flow chart illustrating an exemplary process 1300 for determining an SCS and CP configuration for wireless communication in accordance with some aspects of the present disclosure. As described below, some or all illustrated features may be omitted in a particular implementation within the scope of the present disclosure, and some illustrated features may not be required for implementations. In some examples, the process 1300 may be carried out by the wireless communication device 1100 illustrated in FIG. 11. In some examples, the process 1300 may be carried out by any suitable apparatus or means for carrying out the functions or algorithm described below. A UE can use the process 1300 to determine when to switch between different configurations of SCS and CP, for example, based on a traffic type of the wireless communication.

At block 1302, a UE can determine a traffic type of a sidelink transmission between the UE and another sidelink device. For example, the UE may be a P-UE 308 and the other sidelink device may be an UAV 318, In one aspect, the SCS and CP configuration circuitry 1142 can provide a means to determine the traffic type of sidelink communication. Examples of sidelink traffic type are control channel traffic (e.g., PSCCH) and data channel traffic (e.g., PSSCH). In general, sidelink control channels are more robust to ISI and ICI. However, sidelink data channel may be more susceptible to ISI and ICI in longer range communication.

At block 1304, if the traffic type is control channel traffic, the UE can select a default SCS and CP configuration for sidelink communication. In one aspect, the SCS and CP configuration circuitry 1142 can provide a means to configure the UE to use the default SCS and CP configuration. In one example, the default SCS and CP configuration may use a numerology with a normal CP length.

At block 1306, if the traffic type is data channel traffic, the UE can select an SCS and CP configuration for mitigating ISI/ICI due to a longer delay spread (e.g., longer range) in sidelink communication. For example, the P-UE 308 and the UAV 318 can move further apart from each other during sidelink communication, resulting in a larger delay spread. In one aspect, the SCS and CP configuration circuitry 1142 can provide a means to configure the UE to use the long-range SCS and CP configuration. In one example, the long-range SCS and CP configuration may use a numerology with an extended CP length (i.e., longer than a normal CP).

In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means. Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1 and/or 3, and utilizing, for example, the processes and/or algorithms described herein in relation to FIGS. 12 and/or 13.

A first aspect of disclosure provides an apparatus for wireless communication. The apparatus comprises: a transceiver; a memory; and a processor coupled to the transceiver and the memory, wherein the processor and the memory are configured to: transmit, in a first sidelink resource of a sidelink resource pool, a first sidelink transmission using a first configuration of subcarrier spacing (SCS) and cyclic prefix (CP); and transmit, in a second sidelink resource of the sidelink resource pool, a second sidelink transmission using a second configuration of SCS and CP, the second configuration being different from the first configuration in terms of at least one of an SCS or a CP.

In a second aspect, alone or in combination with the first aspect, wherein the first sidelink resource corresponds to a first time slot and the second sidelink resource corresponds to a second time slot, within a resource pool period of the sidelink resource pool.

In a third aspect, alone or in combination with the first aspect, wherein the first sidelink resource corresponds to a first sub-channel associated with the first configuration of SCS and CP, and the second sidelink resource corresponds to a second sub-channel associated with the second configuration of SCS and CP.

In a fourth aspect, alone or in combination with any of the first to third aspects, wherein the first sidelink transmission comprises an indication that indicates the second configuration of SCS and CP for transmitting the second sidelink transmission.

In a fifth aspect, alone or in combination with the fourth aspect, wherein the indication comprises sidelink control information (SCI) that indicates a change from the first configuration of SCS and CP to the second configuration of SCS and CP.

In a sixth aspect, alone or in combination with the first or third aspect, wherein the processor and the memory are further configured to: switch from the first configuration of SCS and CP to the second configuration of SCS and CP within a time slot of the first configuration.

In a seventh aspect, alone or in combination with any of the first or sixth aspect, wherein the first sidelink transmission and the second sidelink transmission respectively correspond to different portions of a sidelink message or different traffic types.

In an eighth aspect, alone or in combination with any of the first to seventh aspects, wherein the first sidelink transmission comprises a PSCCH, and the second sidelink transmission comprises a PSSCH.

In a ninth aspect, alone or in combination with any of the first to seventh aspects, wherein the processor and the memory are further configured to: determine whether a traffic type of the second sidelink transmission is sidelink data traffic or sidelink control traffic; and switch to the second configuration of SCS and CP in response to the determination that the traffic type is sidelink data traffic.

A tenth aspect of the disclosure provides a method for wireless communication at a user equipment, comprising: transmitting, in a first sidelink resource of a sidelink resource pool, a first sidelink transmission using a first configuration of subcarrier spacing (SCS) and cyclic prefix (CP); and transmitting, in a second sidelink resource of the sidelink resource pool, a second sidelink transmission using a second configuration of SCS and CP, the second configuration being different from the first configuration in terms of at least one of an SCS or a CP.

In an eleventh aspect, alone or in combination with the tenth aspect, wherein the first sidelink resource corresponds to a first time slot and the second sidelink resource corresponds to a second time slot, within a resource pool period of the sidelink resource pool.

In a twelfth aspect, alone or in combination with the tenth aspect, wherein the first sidelink resource corresponds to a first sub-channel associated with the first configuration of SCS and CP, and the second sidelink resource corresponds to a second sub-channel associated with the second configuration of SCS and CP.

In a thirteenth aspect, alone or in combination with any of the tenth to twelfth aspects, wherein the first sidelink transmission comprises an indication that indicates the second configuration of SCS and CP for transmitting the second sidelink transmission.

In a fourteenth aspect, alone or in combination with the thirteenth aspect, wherein the indication comprises sidelink control information (SCI) that indicates a change from the first configuration of SCS and CP to the second configuration of SCS and CP.

In a fifteenth aspect, alone or in combination with the tenth or twelfth aspect, the method further comprises: switching from the first configuration of SCS and CP to the second configuration of SCS and CP within a time slot of the first configuration.

In a sixteenth aspect, alone or in combination with any of the tenth to fifteenth aspects, wherein the first sidelink transmission and the second sidelink transmission respectively correspond to different portions of a sidelink message or different traffic types.

In a seventeenth aspect, alone or in combination with any of the tenth to fifteenth aspects, wherein the first sidelink transmission comprises a PSCCH, and the second sidelink transmission comprises a PSSCH.

In an eighteenth aspect, alone or in combination with any of the tenth to twelfth aspects, the method further comprises: determining whether a traffic type of the second sidelink transmission is sidelink data traffic or sidelink control traffic; and switching to the second configuration of SCS and CP in response to the determination that the traffic type is sidelink data traffic.

A nineteenth aspect of the disclosure provides an apparatus for wireless communication. The apparatus comprises: means for transmitting, in a first sidelink resource of a sidelink resource pool, a first sidelink transmission using a first configuration of subcarrier spacing (SCS) and cyclic prefix (CP); and means for transmitting, in a second sidelink resource of the sidelink resource pool, a second sidelink transmission using a second configuration of SCS and CP, the second configuration being different from the first configuration in terms of at least one of an SCS or a CP.

In a twentieth aspect, alone or in combination with the nineteenth aspect, wherein the first sidelink resource corresponds to a first time slot and the second sidelink resource corresponds to a second time slot, within a resource pool period of the sidelink resource pool.

In a twenty-first aspect, alone or in combination with the nineteenth aspect, wherein the first sidelink resource corresponds to a first sub-channel associated with the first configuration of SCS and CP, and the second sidelink resource corresponds to a second sub-channel associated with the second configuration of SCS and CP.

In a twenty-second aspect, alone or in combination with any of the nineteenth to twenty-first aspects, wherein the first sidelink transmission comprises an indication that indicates the second configuration of SCS and CP for transmitting the second sidelink transmission.

In a twenty-third aspect, alone or in combination with the twenty-second aspect, wherein the indication comprises sidelink control information (SCI) that indicates a change from the first configuration of SCS and CP to the second configuration of SCS and CP.

In a twenty-fourth aspect, alone or in combination with any of the nineteenth or twenty-first aspect, the apparatus further comprises: means for switching from the first configuration of SCS and CP to the second configuration of SCS and CP within a time slot of the first configuration.

In a twenty-fifth aspect, alone or in combination with any of the nineteenth to twenty-fourth aspects, wherein the first sidelink transmission and the second sidelink transmission respectively correspond to different portions of a sidelink message or different traffic types.

In a twenty-sixth aspect, alone or in combination with any of the nineteenth to twenty-first aspects, the apparatus further comprises: means for determining whether a traffic type of the second sidelink transmission is sidelink data traffic or sidelink control traffic; and means for switching to the second configuration of SCS and CP in response to the determination that the traffic type is sidelink data traffic.

A twenty-seventh aspect of the disclosure provides an article of manufacture comprising a non-transitory computer-readable medium storing computer-executable code.

The computer-executable code comprises code for causing an apparatus to: transmit, in a first sidelink resource of a sidelink resource pool, a first sidelink transmission using a first configuration of subcarrier spacing (SCS) and cyclic prefix (CP); and transmit, in a second sidelink resource of the sidelink resource pool, a second sidelink transmission using a second configuration of SCS and CP, the second configuration being different from the first configuration in terms of at least one of an SCS or a CP.

In a twenty-eighth aspect, alone or in combination with the twenty-seventh aspect, wherein the first sidelink resource corresponds to a first time slot and the second sidelink resource corresponds to a second time slot, within a resource pool period of the sidelink resource pool.

In a twenty-ninth aspect, alone or in combination with the twenty-seventh aspect, wherein the first sidelink resource corresponds to a first sub-channel associated with the first configuration of SCS and CP, and the second sidelink resource corresponds to a second sub-channel associated with the second configuration of SCS and CP.

In a thirtieth aspect, alone or in combination with any of the twenty-seventh or twenty-ninth aspect, wherein the non-transitory computer-readable medium further comprises code for causing the apparatus to: switch from the first configuration of SCS and CP to the second configuration of SCS and CP within a time slot of the first configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration," Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-13 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 § 112(f) unless the element is expressly recited using the phrase "means for" or, in the case of a method claim, the element is recited using the phrase "step for."

What is claimed is:

1. An apparatus for wireless communication, comprising:
a memory; and
one or more processors coupled to the memory,
the one or more processors being configured to:
transmit, in a first sidelink resource of a sidelink resource pool, a first sidelink transmission using a first configuration of subcarrier spacing (SCS) and cyclic prefix (CP);
determine whether a traffic type of a second sidelink transmission is sidelink data traffic or sidelink control traffic;
switch to a second configuration of SCS and CP in response to the determination that the traffic type is sidelink data traffic; and transmit, in a second sidelink resource of the sidelink resource pool, the second sidelink transmission using the second configuration of SCS and CP, the second configuration being different from the first configuration in terms of at least one of an SCS or a CP.

2. The apparatus of claim 1, wherein the first sidelink resource corresponds to a first time slot and the second sidelink resource corresponds to a second time slot, within a resource pool period of the sidelink resource pool.

3. The apparatus of claim 1, wherein the first sidelink resource corresponds to a first sub-channel associated with the first configuration of SCS and CP, and the second sidelink resource corresponds to a second sub-channel associated with the second configuration of SCS and CP.

4. The apparatus of claim 1, wherein the first sidelink transmission comprises an indication that indicates the second configuration of SCS and CP for transmitting the second sidelink transmission.

5. The apparatus of claim 4, wherein the indication comprises sidelink control information (SCI) that indicates a change from the first configuration of SCS and CP to the second configuration of SCS and CP.

6. The apparatus of claim 1, wherein the one or more processors are further configured to:
switch from the first configuration of SCS and CP to the second configuration of SCS and CP within a time slot of the first configuration.

7. The apparatus of claim 1, wherein the first sidelink transmission and the second sidelink transmission respectively correspond to different portions of a sidelink message or different traffic types.

8. The apparatus of claim 1, wherein the first sidelink transmission comprises a physical sidelink control channel (PSCCH), and the second sidelink transmission comprises a physical sidelink shared channel (PSSCH).

9. A method for wireless communication at a user equipment, comprising:
transmitting, in a first sidelink resource of a sidelink resource pool, a first sidelink transmission using a first configuration of subcarrier spacing (SCS) and cyclic prefix (CP);
determining whether a traffic type of a second sidelink transmission is sidelink data traffic or sidelink control traffic;
switching to a second configuration of SCS and CP in response to the determination that the traffic type is sidelink data traffic; and
transmitting, in a second sidelink resource of the sidelink resource pool, the second sidelink transmission using the second configuration of SCS and CP, the second configuration being different from the first configuration in terms of at least one of an SCS or a CP.

10. The method of claim 9, wherein the first sidelink resource corresponds to a first time slot and the second sidelink resource corresponds to a second time slot, within a resource pool period of the sidelink resource pool.

11. The method of claim 9, wherein the first sidelink resource corresponds to a first sub-channel associated with the first configuration of SCS and CP, and the second sidelink resource corresponds to a second sub-channel associated with the second configuration of SCS and CP.

12. The method of claim 9, wherein the first sidelink transmission comprises an indication that indicates the second configuration of SCS and CP for transmitting the second sidelink transmission.

13. The method of claim 12, wherein the indication comprises sidelink control information (SCI) that indicates a change from the first configuration of SCS and CP to the second configuration of SCS and CP.

14. The method of claim 9, further comprising:
switching from the first configuration of SCS and CP to the second configuration of SCS and CP within a time slot of the first configuration.

15. The method of claim 9, wherein the first sidelink transmission and the second sidelink transmission respectively correspond to different portions of a sidelink message or different traffic types.

16. The method of claim 9, wherein the first sidelink transmission comprises a physical sidelink control channel (PSCCH), and the second sidelink transmission comprises a physical sidelink shared channel (PSSCH).

17. An apparatus for wireless communication, comprising:
means for transmitting, in a first sidelink resource of a sidelink resource pool, a first sidelink transmission using a first configuration of subcarrier spacing (SCS) and cyclic prefix (CP);
means for determining whether a traffic type of a second sidelink transmission is sidelink data traffic or sidelink control traffic;
means for switching to a second configuration of SCS and CP in response to the determination that the traffic type is sidelink data traffic; and
means for transmitting, in a second sidelink resource of the sidelink resource pool, the second sidelink transmission using the second configuration of SCS and CP, the second configuration being different from the first configuration in terms of at least one of an SCS or a CP.

18. The apparatus of claim 17, wherein the first sidelink resource corresponds to a first time slot and the second sidelink resource corresponds to a second time slot, within a resource pool period of the sidelink resource pool.

19. The apparatus of claim 17, wherein the first sidelink resource corresponds to a first sub-channel associated with the first configuration of SCS and CP, and the second sidelink resource corresponds to a second sub-channel associated with the second configuration of SCS and CP.

20. The apparatus of claim 17, wherein the first sidelink transmission comprises an indication that indicates the second configuration of SCS and CP for transmitting the second sidelink transmission.

21. The apparatus of claim 20, wherein the indication comprises sidelink control information (SCI) that indicates a change from the first configuration of SCS and CP to the second configuration of SCS and CP.

22. The apparatus of claim 17, further comprising:
means for switching from the first configuration of SCS and CP to the second configuration of SCS and CP within a time slot of the first configuration.

23. The apparatus of claim 17, wherein the first sidelink transmission and the second sidelink transmission respectively correspond to different portions of a sidelink message or different traffic types.

24. An article of manufacture comprising a non-transitory computer-readable medium storing computer-executable code, comprising code for causing an apparatus to:
transmit, in a first sidelink resource of a sidelink resource pool, a first sidelink transmission using a first configuration of subcarrier spacing (SCS) and cyclic prefix (CP);
determine whether a traffic type of a second sidelink transmission is sidelink data traffic or sidelink control traffic;

switch to a second configuration of SCS and CP in response to the determination that the traffic type is sidelink data traffic; and transmit, in a second sidelink resource of the sidelink resource pool, the second sidelink transmission using the second configuration of SCS and CP, the second configuration being different from the first configuration in terms of at least one of an SCS or a CP.

25. The article of manufacture of claim 24, wherein the first sidelink resource corresponds to a first time slot and the second sidelink resource corresponds to a second time slot, within a resource pool period of the sidelink resource pool.

26. The article of manufacture of claim 24, wherein the first sidelink resource corresponds to a first sub-channel associated with the first configuration of SCS and CP, and the second sidelink resource corresponds to a second sub-channel associated with the second configuration of SCS and CP.

27. The article of manufacture of claim 24, wherein the non-transitory computer-readable medium further comprises code for causing the apparatus to:

switch from the first configuration of SCS and CP to the second configuration of SCS and CP within a time slot of the first configuration.

* * * * *